United States Patent
Jiang et al.

(10) Patent No.: US 10,461,376 B2
(45) Date of Patent: Oct. 29, 2019

(54) BUS-BAR ASSEMBLY, POWER BATTERY OVER-LOAD PROTECTION SYSTEM AND METHOD, AND POWER BATTERY ASSEMBLY

(71) Applicant: NIO NEXTEV LIMITED, Hong Kong (CN)

(72) Inventors: Yaping Jiang, Shanghai (CN); Hui Qi, Shanghai (CN); Jie Fang, Shanghai (CN); Chong He, Shanghai (CN)

(73) Assignee: NIO NEXTEV LIMITED, Hong Kong (CN)

( * ) Notice: Subject to any disclaimer, the term of this patent is extended or adjusted under 35 U.S.C. 154(b) by 25 days.

(21) Appl. No.: 15/708,733

(22) Filed: Sep. 19, 2017

(65) Prior Publication Data
US 2018/0083323 A1 Mar. 22, 2018

(30) Foreign Application Priority Data
Sep. 20, 2016 (CN) .......................... 2016 1 0832931

(51) Int. Cl.
*H01M 10/42* (2006.01)
*H01M 2/20* (2006.01)

(52) U.S. Cl.
CPC ....... *H01M 10/4257* (2013.01); *H01M 2/206* (2013.01); *H01M 2010/4271* (2013.01); *H01M 2200/106* (2013.01)

(58) Field of Classification Search
CPC ............. H01M 10/4257; H01M 2/206; H01M 2200/106; H01M 2010/4271
See application file for complete search history.

(56) References Cited

U.S. PATENT DOCUMENTS

| 6,177,209 B1* | 1/2001 | Okutoh | H01M 10/42 |
| | | | 429/62 |
| 6,356,051 B1* | 3/2002 | Hasunuma | H01M 2/105 |
| | | | 320/107 |
| 2011/0008655 A1* | 1/2011 | White | H01M 2/1055 |
| | | | 429/62 |

(Continued)

FOREIGN PATENT DOCUMENTS

| CN | 1278366 | 12/2000 |
| CN | 200993978 | 12/2007 |

(Continued)

OTHER PUBLICATIONS

International Search Report for International (PCT) Patent Application No. PCT/CN2017/091612, dated Sep. 20, 2017, 4 pages.

*Primary Examiner* — Stewart A Fraser
(74) *Attorney, Agent, or Firm* — Sheridan Ross P.C.

(57) ABSTRACT

The invention provides a bus-bar assembly, a power battery over-load protection system and method, as well as a power battery assembly, wherein the bus-bar assembly comprises a first connection arm having one or more connection ends so as to be connected to an upstream battery cell; a second connection arm having one or more connection ends so as to be connected to a downstream battery cell; and a PTC unit connected between the first connection arm and the second connection arm. The bus-bar assembly, the over-load protection system, the power battery assembly and the vehicle or the like according to the invention has better safety and stability.

12 Claims, 3 Drawing Sheets

(56) References Cited

U.S. PATENT DOCUMENTS

| | | | |
|---|---|---|---|
| 2011/0045321 A1* | 2/2011 | Park .................... | H01M 2/0404 429/7 |
| 2015/0030898 A1* | 1/2015 | Butzmann .............. | G01K 1/026 429/90 |
| 2015/0064518 A1* | 3/2015 | Chen .................... | H01M 2/348 429/62 |
| 2018/0047485 A1* | 2/2018 | Golubovic ............. | H01C 7/021 |

FOREIGN PATENT DOCUMENTS

| | | |
|---|---|---|
| CN | 101267030 | 9/2008 |
| CN | 105870885 | 8/2016 |
| CN | 106229453 | 12/2016 |
| CN | 206225447 | 6/2017 |
| EP | 1251527 | 10/2004 |
| JP | H02-69440 | 5/1990 |
| JP | 2001-68304 | 3/2001 |
| JP | 2005-259421 | 9/2005 |

* cited by examiner

BUS-BAR ASSEMBLY, POWER BATTERY OVER-LOAD PROTECTION SYSTEM AND METHOD, AND POWER BATTERY ASSEMBLY

CROSS-REFERENCE TO RELATED APPLICATION

This application claims the benefit of China Patent Application No. 201610832931.7 filed Sep. 20, 2016, the entire contents of which are incorporated herein by reference.

FIELD OF THE INVENTION

The invention relates to the technical field of over-load protection of power battery for new energy vehicle, and more specifically, to a bus-bar assembly, a power battery over-load protection system and over-load protection method, as well as a power battery assembly.

BACKGROUND

With the development of technologies of new energy vehicles, in particular pure electric vehicles, the safety of electric vehicles has drawn more and more attention from people. As a high voltage power supply component of electric vehicle, the safety of power battery is especially important. An over-load protection design of the power battery is used for improving the safety of battery pack.

For a power battery assembly of existing electric vehicles, the over-load protection of the power battery typically comprises an over-load current limiting protection based on battery management system (BMS) and a fuse protection based on fuse holder. The over-load current limiting protection detects battery temperature and current signals through the BMS, and sends an instruction to the whole vehicle control unit (VCU) when the temperature and the current are overly high. Then, the VCU sends an instruction to reduce external loads. The whole control process is long and complicated, and requires a computer to control actuator, thus presenting a risk of failure; in the fuse protection, the fuse holder generates a lot of heat in case of a large load current so as to directly melt the fuse, thus causing a mechanical circuit break.

SUMMARY OF THE INVENTION

An object of the invention is to provide an improved over-load protection system and method for power battery.

Other objects of the invention aim to overcome or at least alleviate existing problems in the prior art.

According to an aspect of the invention, a bus-bar assembly for power battery of vehicle is provided, comprising:
a first connection arm having one or more connection ends so as to be connected to an upstream battery cell;
a second connection arm having one or more connection ends so as to be connected to a downstream battery cell; and
a PTC unit connected between the first connection arm and the second connection arm.

Optionally, in some embodiments of the bus-bar assembly, the PTC unit is of a sheet-shaped, and the first connection arm and the second connection arm are connected to opposite faces of the PTC unit respectively.

Optionally, in some embodiments of the bus-bar assembly, the first connection arm and the second connection arm are welded to the PTC unit respectively.

Optionally, in some embodiments of the bus-bar assembly, the first connection arm and/or the second connection arm has a constricted portion near the position where the first connection arm and/or the second connection arm is connected to the PTC unit.

Optionally, in some embodiments of the bus-bar assembly, the first connection arm, the second connection arm and the PTC unit are coated with an insulated thermal-protective coating near the position where they are connected.

Optionally, in some embodiments of the bus-bar assembly, the first connection arm and/or the second connection arm comprises a main portion and one or more connection ends extending from the main portion, and the connection ends are used to be connected to battery cells and have mounting holes.

Optionally, in some embodiments of the bus-bar assembly, the main portion is wrapped by an insulation piece, and the connection ends are wrapped by an insulation sleeve.

According to another aspect of the invention, an over-load protection system for power battery of vehicle is provided, which comprises an over-load protection system based on a PTC unit, and the over-load protection system based on PTC unit comprises one or more PTC units connected between battery cells.

Optionally, in some embodiments of the over-load protection system, the one or more PTC units are connected between battery cells through the bus-bar assembly according to the embodiments of the invention.

Optionally, in some embodiments of the over-load protection system, the over-load protection system further comprises a fuse protection system based on resistance wire and an over-load current limiting protection system based on battery management system.

Optionally, in some embodiments of the over-load protection system, the over-load protection system is configured in such a way that the over-load protection system based on PTC unit functions before or after the over-load current limiting protection system based on battery management system.

Optionally, in some embodiments of the over-load protection system, the battery management system monitors an instantaneous resistance of the PTC unit by sampling a voltage across the PTC unit.

According to further another aspect of the invention, a power battery assembly for vehicle is provided, characterized in that the power battery assembly comprises a plurality of battery cells and one or more PTC units connected in series with the plurality of battery cells.

Optionally, in some embodiments of the power battery assembly, the one or more PTC units are connected between battery cells through the bus-bar assembly according to the embodiments of the invention.

According to still another aspect of the invention, an over-load protection method for power battery of vehicle is provided, comprising connecting the bus-bar assembly according to the embodiments of the invention in series between the battery cells of the power battery for vehicle.

The bus-bar assembly, the over-load protection system and method as well as the power battery assembly or the like present better safety and stability.

BRIEF DESCRIPTION OF THE DRAWINGS

The above the other features of the invention will become more apparent with reference to the accompanying drawings, wherein.

DETAILED DESCRIPTION OF THE INVENTION

It can be easily understood that according to the technical solutions of the invention, those skilled in the art can propose many forms of structures and implementations that can be replaced with each other without departing from the true spirit of the invention. Therefore, the following specific embodiments and drawings are merely illustrative description of the technical solutions of the invention, and should not be considered as the entirety of the invention or as limiting or restricting the technical solutions of the invention.

Oriental terms such as "upper", "lower", "left", "right", "front", "rear", "front side", "back side", "top", "bottom" or the like that were mentioned or might have been mentioned in the description are defined with respect to the configuration as shown in individual drawings, and they are relative concepts. Therefore, it is possible that these terms may be changed correspondingly according to different locations and different states of use. Thus, these or other oriental terms should also not be considered as limiting terms.

Figure 1:
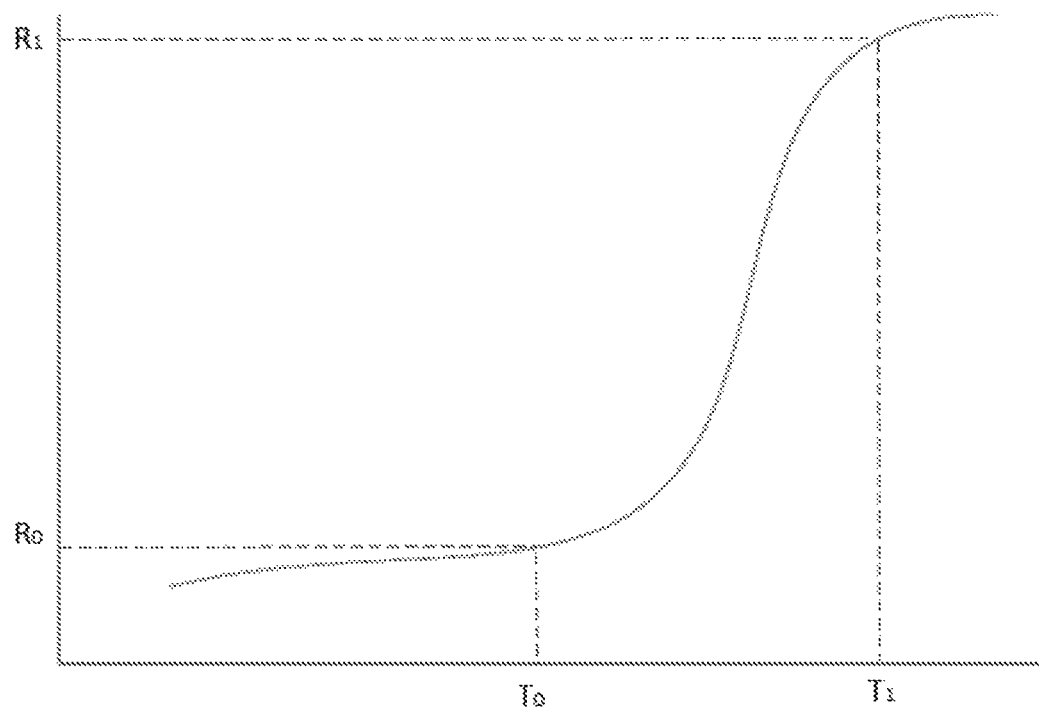
FIG. 1 shows a temperature-resistance characteristic curve of PTC unit.

Reference is made to FIG. 1. The PTC is also referred to as positive temperature coefficient thermal sensitive resistor, of which the resistance value $R_0$ is in positive correlation with the temperature after the temperature exceeds a predetermined point $T_0$, and is increased rapidly. For example, at the temperature $T_1$ as shown in the figure, the resistance $R_1$ is increased to a value that is several times larger than $R_0$. At the same time, the temperature of PTC is in positive correlation with the current flowing through PTC. With this characteristic of PTC, the over-load protection system of power battery for existing electric vehicles or hybrid vehicles can be optimized.

Figure 2:
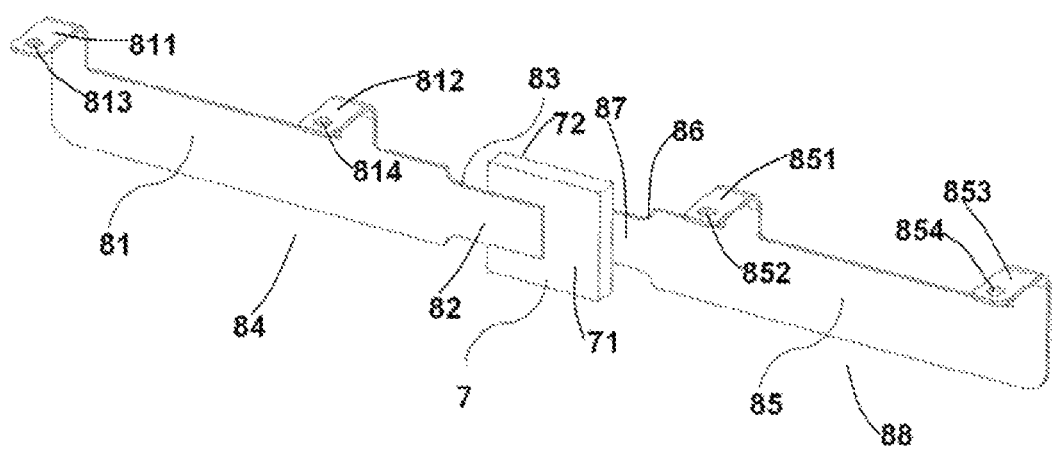
FIG. 2 shows a bus-bar assembly according to an embodiment of the invention.

Specifically, with reference to FIG. 2, according to some embodiments of the invention, a bus-bar assembly is provided, which is used for being connected between battery cells. For example, it is connected between every six battery cells or every twelve battery cells, or connected in other ways between battery cells that are connected in series. The bus-bar assembly comprises a first connection arm 84 having one or more connection ends 811, 812 for connecting to an upstream battery cell, a second connection arm 88 having one or more connection ends 851, 853 for connecting to a downstream battery cell, and a PTC unit 7 connected between the first connection arm 84 and the second connection arm 88.

In some embodiments, the first connection arm 84 comprises a main portion 81 and one or more connection ends extending from the main portion 81. In the illustrated embodiments, there are two connection ends 811, 812. In some embodiments, the main portion 81 is substantially of a flat sheet shape, and the connection ends 811, 812 each can extend substantially perpendicular to the main portion 81, or the connection ends 811, 812 can be formed by bending extension parts of a flat sheet shape. Each of connection ends 811, 812 can have mounting holes 813, 814, respectively for fixed connection with battery cells. In some embodiments, the first connection arm 84 has a constricted portion 82 near the position where the first connection arm 84 is connected to the PTC unit. When the first connection arm 84 is formed into a flat sheet shape, the constricted portion 82 has a smaller width than the main portion 81, and the main portion 81 extends to the constricted portion 82 via a transition section 83. The transition section 83 can be formed into a concave arc shape as shown. The existence of the constricted portion 82 can improve current sensitivity near the PTC unit 7, and enhance the sensitivity to the current of the PTC unit. In some embodiments, the width at the end of the constricted portion 82 can be adjusted so as to adjust the PTC unit's sensitivity to the current. In an alternative embodiment, the main portion 81 and the constricted portion 82 of the first connection arm can be of other shapes, such as a columnar shape. In an alternative embodiment, the number of the connection ends can be one, three, four or another number. In some embodiments, the first connection arm 84 is made of a conductive material, such as copper, and the like.

Similarly, the second connection arm 88 comprises a main portion 85 and one or more connection ends extending from the main portion 85. In the illustrated embodiments, there are two connection ends 851, 853. In some embodiments, the main portion 85 is substantially of a flat sheet shape, and the individual connection ends 851, 853 can extend substantially perpendicular to the main portion 85, or the connection ends 851, 853 can be formed by bending extension parts of a flat sheet shape. Each of the connection ends 851, 853 can have mounting holes 852, 854, respectively for fixed connection with battery cells. In some embodiments, the second connection arm 88 has a constricted portion 87 near the position where the second connection arm 88 is connected to the PTC unit. When the second connection arm 88 is formed into a flat sheet shape, the constricted portion 87 has a smaller width than the main portion 85, and the main portion 85 extends to the constricted portion 87 via a transition section 86. The transition section 86 can be formed into a concave arc shape as shown.

In some embodiments, the PTC unit 7 is formed into a sheet-shaped, and can have different thicknesses. The sheet like PTC unit comprises a first surface 71, a second surface 72 opposite to the first surface 71, and peripheral narrow end faces (not indicated). The first connection arm 84 is connected to the first surface 71 of the PTC unit 7, and the second connection arm 88 is connected to the second surface 72 of the PTC unit 7. In some embodiments, the constricted portion 82 of the first connection arm 84 and the constricted portion 87 of the second connection arm 88 can be connected to the opposite faces 71, 72 of the sheet like PTC unit 7. In some embodiments, the first connection arm 84 and the second connection arm 88 can be connected to the PTC unit 7 by welding. With the sheet like PTC unit 7, the current sensitivity of the PTC unit 7 is further improved. The PTC unit 7 in the illustrated embodiment has a substantially rectangular sheet-shaped, whereas in alternative embodiments, the PTC unit 7 can have a circular sheet-shaped or other shapes. In addition, in an alternative embodiment, a PTC unit having another shape can be also chosen, and the first and second connection arms can be also connected to the PTC unit in other ways, e.g., connected to the same side or two end faces of the PTC unit, etc.

Figure 3:
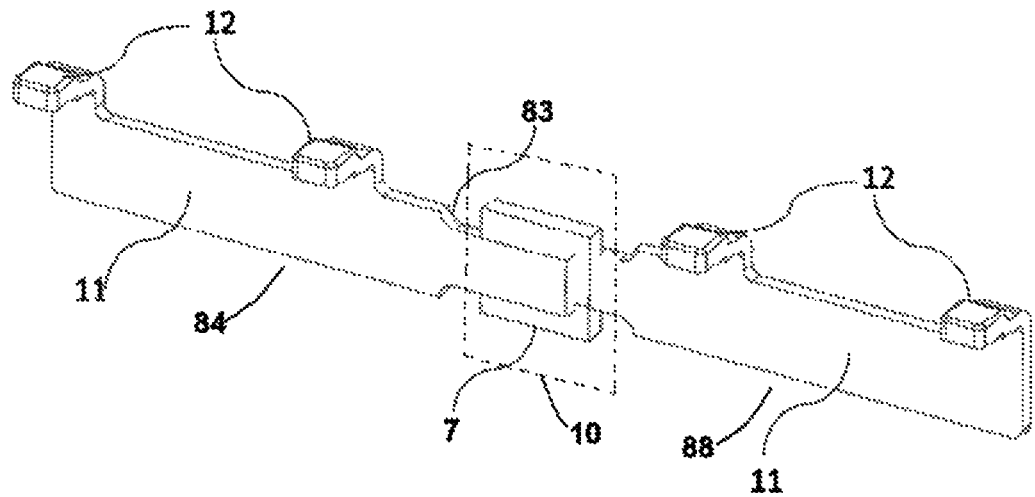
FIG. 3 shows a bus-bar assembly according to another embodiment of the invention.
Figure 4:
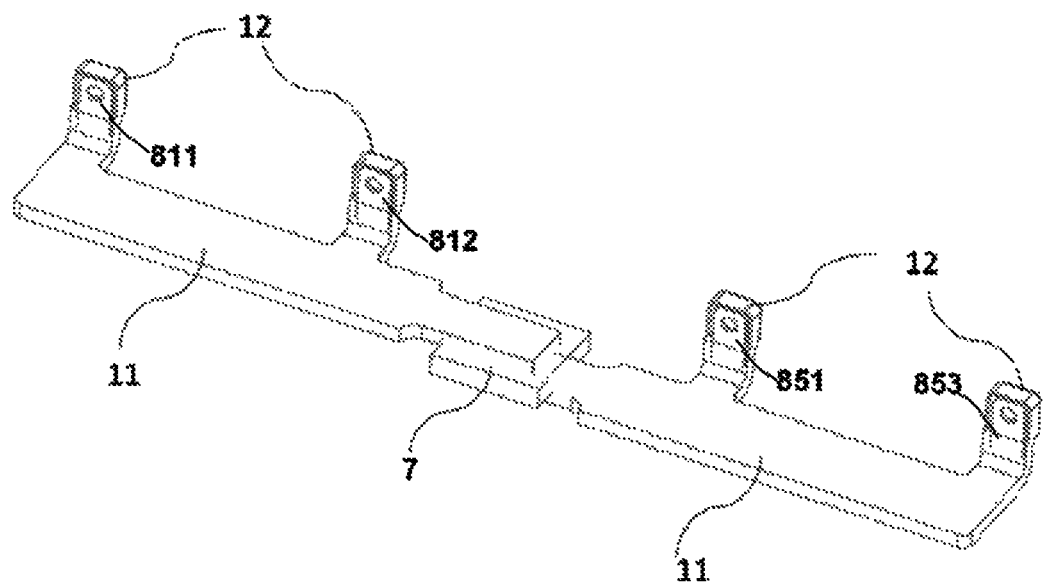
FIG. 4 shows a view of the bus-bar in FIG. 3 from another perspective.

With reference to FIGS. 3 and 4, in some embodiments, in an area 10 near the PTC unit 7, coatings are applied to the surfaces of the PTC unit 7 and portions of the first and second connection arms that are connected to the PTC unit 7. The coating can be insulated thermal-protective coating. On one hand, the insulated thermal-protective coating can serve for insulation purpose, and on the other hand, it can prevent the PTC unit 7 from dissipating heat rapidly so that the PTC unit 7 can keep a high resistance stage for a certain time period until the load is reduced and the current is stable. In some embodiments, the time period for which the PTC unit 7 keeps the high resistance stage can be adjusted by adjusting the thickness of the applied material or layer, for example. In some embodiments, the first connection arm 84 and the second connection arm 88 are wrapped by an insulation piece 11. In an embodiment, the individual connection ends 811, 812, 851 and 853 are wrapped by an insulation cap 12.

In some other embodiments, the invention further provides an over-load protection system of power battery for electric vehicle, which comprises one or more PTC units connected between battery cells by for example using the bus-bar assembly with PTC unit as described above. In some embodiments, the over-load protection system further comprises a fuse protection system based on resistance wire and an over-load current limiting protection based on battery management system.

Existing over-load protections systems typically comprise a fuse protection system based on resistance wire and an over-load current limiting protection based on battery management system. For an electrically controlled system based on BMS, the BMS detects battery temperature and circuit current, and feeds them back to the vehicle control unit. Then, the vehicle control unit sends an instruction by computing so as to reduce loads for motor controller. The whole control is realized by software, and the process is long. Misjudgment and erroneous misjudgment may easily occur. The entire control realizes current limiting by controlling external load. The power battery itself does not have an over-load current limiting protection. The over-load protection based on electrical control may fail under extreme conditions, and a potential safety hazard exists.

For the fuse protection system of power battery, a fuse box is typically designed in the main circuit so as to realize protection in a condition of extremely large current. If the fuse wire is melted directly, arcing may easily occur. Moreover, during high speed driving, power may be completely lost all of a sudden, thus leading to severe hidden safety hazard for people. The fuse wire cannot be restored after being melted, and the vehicle cannot keep running before the fuse wire is replaced.

The invention provides an additional over-load protection for power battery, which functions between the fuse protection system based on resistance wire and the over-load current limiting protection based on battery management system, or serves as the over-load protection which functions firstly. The control method and physical parameters of the PTC unit and the fuse unit can be adjusted so as to realize an improved over-load protection solution. For example, the temperature-resistance curve of the PTC unit can be configured so that the over-load protection system based on the PTC unit can be set so as to function after the over-load current limiting protection system has failed. Specifically, when the current is increased to $I_0$, the over-load current limiting protection system based on BMS functions firstly; and when the over-load current limiting protection based on BMS fails, after the current continues to be increased to $I_1$, the over-load protection based on the PTC unit functions, that is, the PTC unit exhibits a high resistance stage to limit the current. Since the over-load protection based on the PTC unit is a physical over-load protection which is not based on electrical control or software control, it has higher stability and safety, and typically will not fail. Therefore, even in an extreme condition, the fuse wire will not be melted. However, the existence of the fuse protection system constitutes a bottom line of over-load protection so that the entire over-load protection system is more perfect. In some embodiments, the battery management system monitors an instantaneous resistance of the PTC unit by sampling a voltage across the PTC unit. In addition, in an embodiment where the power battery has a plurality of bus-bar assemblies with PTC, characteristics such as size and material of the PTC units of individual bus-bar assemblies can be set so that individual bus-bar assemblies have different temperature-resistance curves, thus realizing a multilevel over-load protection.

Figure 5:
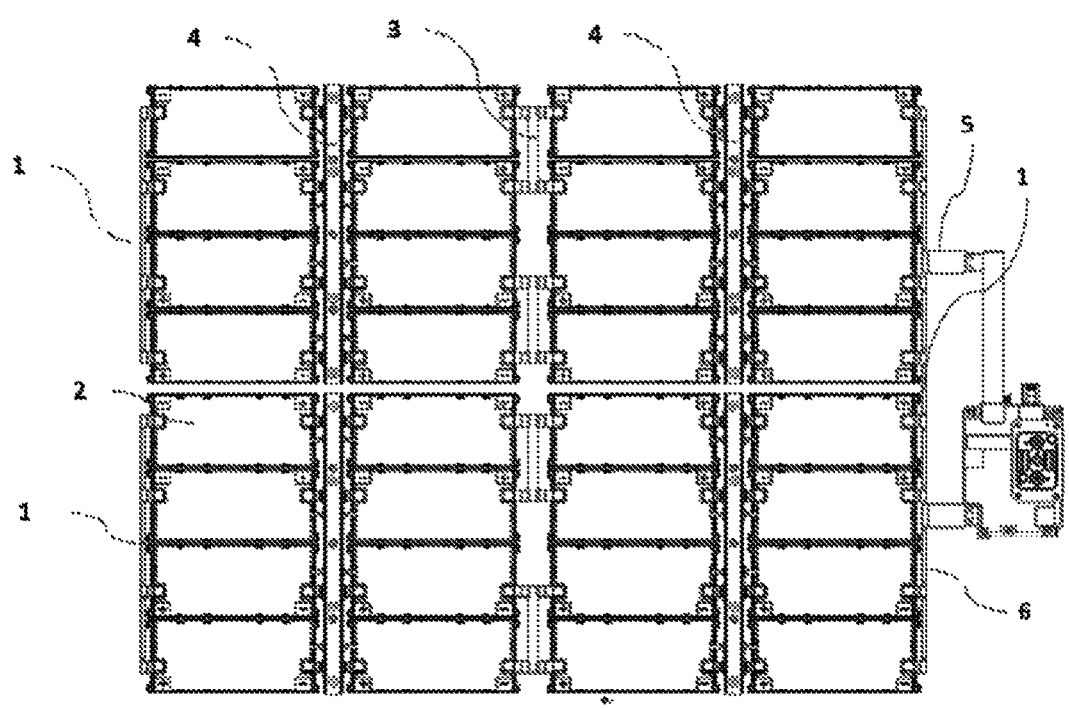
FIG. 5 shows a battery assembly according to an embodiment of the invention.

With reference to FIG. 5, a schematic view of the power battery according to the embodiment of the invention is shown. The power battery comprises a plurality of battery individual 2, each of which may comprise for example about six battery cells. One bus-bar assembly 1 with PTC unit can be disposed every other two battery individual 2. Moreover, the electrical bus-bar 3 is disposed between battery individual 2 for common electrical connection. In addition, the power battery further comprises a bus-bar bundle assembly 4 and power output bus-bar 5 and power output bus-bar 6 for connecting with loads.

In a further embodiment, the invention also provides an over-load protection method of power battery for vehicle which comprises connecting the bus-bar assembly according to the embodiments of the invention in series between the battery cells of the power battery for vehicle.

In a further embodiment, the invention also provides a vehicle having the bus-bar assembly according to the embodiment of the invention, e.g., pure electric vehicles or hybrid vehicles, etc.

It should be understood that all the above preferred embodiments are illustrative rather than being limiting. Various modifications or variations made to the above described specific embodiments by those skilled in the art within the concept of the invention will all fall within the legal scope of protection of the invention.

The invention claimed is:

1. A bus-bar assembly for the power battery of a vehicle, comprising:
   a first connection arm having one or more connection ends to be connected to an upstream battery cell;
   a second connection arm having one or more connection ends to be connected to a downstream battery cell;
   a PTC unit connected between the first connection arm and the second connection arm; and
   wherein the first connection arm and/or the second connection arm has a constricted portion near the position where the first connection arm and/or the second connection arm is connected to the PTC unit.

2. The bus-bar assembly according to claim 1, wherein the PTC unit is sheet-shaped, and the first connection arm and the second connection arm are connected to opposite faces of the PTC unit, respectively.

3. The bus-bar assembly according to claim 1, wherein the first connection arm and the second connection arm are welded to the PTC unit, respectively.

4. The bus-bar assembly according to claim 1, wherein the first connection arm, the second connection arm and the PTC unit are coated with an insulated thermal-protective coating near the position where they are connected.

5. The bus-bar assembly according to claim 1, wherein the first connection arm and/or the second connection arm comprises a main portion and one or more connection ends extending from the main portion, and the connection ends are used to be connected to battery cells and have mounting holes.

6. The bus-bar assembly according to claim 5, wherein the main portion is wrapped by an insulation piece, and the connection ends are wrapped by an insulation sleeve.

7. An over-load protection method of a power battery for a vehicle, wherein the method comprises connecting the bus-bar assembly according to claim 1 in series between the battery cells for the power battery of the vehicle.

8. An over-load protection system for a power battery of a vehicle, wherein the over-load protection system comprises an over-load protection system based on a PTC unit, and the over-load protection system based on the PTC unit comprises one or more PTC units connected between battery cells; and wherein the one or more PTC units are connected between battery cells through a bus-bar assembly, comprising: a first connection arm having one or more connection ends to be connected to an upstream battery cell; a second connection arm having one or more connection ends to be connected to a downstream battery cell; a PTC unit connected between the first connection arm and the second connection arm and wherein the first connection arm and/or the second connection arm has a constricted portion near the position where the first connection arm and/or the second connection arm is connected to the PTC unit.

9. The over-load protection system according to claim 8, wherein the over-load protection system further comprises a fuse protection system based on resistance wire and an over-load current limiting protection system based on a battery management system.

10. The over-load protection system according to claim 9, wherein the over-load protection system is configured in such a way that the over-load protection system based on PTC unit functions before or after the over-load current limiting protection system based on a battery management system.

11. The over-load protection system according to claim 9, wherein the battery management system monitors an instantaneous resistance of the PTC unit by sampling a voltage across the PTC unit.

12. A power battery assembly for a vehicle, wherein the power battery assembly comprises a plurality of battery cells and one or more PTC units connected in series with the plurality of battery cells; and wherein the one or more PTC units are connected between battery cells through a bus-bar assembly, comprising: a first connection arm having one or more connection ends to be connected to an upstream battery cell; a second connection arm having one or more connection ends to be connected to a downstream battery cell; a PTC unit connected between the first connection arm and the second connection arm and wherein the first connection arm and/or the second connection arm has a constricted portion near the position where the first connection arm and/or the second connection arm is connected to the PTC unit.

* * * * *